US010162652B2

(12) United States Patent
Botta et al.

(10) Patent No.: US 10,162,652 B2
(45) Date of Patent: Dec. 25, 2018

(54) VIDEO GAME APPARATUS FOR ENHANCING A LANGUAGE SKILL LEVEL OF A PLAYER AND PROGRAM THEREFOR

(71) Applicant: SQUARE ENIX HOLDINGS, CO., LTD, Tokyo (JP)

(72) Inventors: Jason Botta, Redwood City, CA (US); Bryan Enriquez, Redwood City, CA (US)

(73) Assignee: SQUARE ENIX HOLDINGS, CO., LTD., Tokyo (JP)

( * ) Notice: Subject to any disclaimer, the term of this patent is extended or adjusted under 35 U.S.C. 154(b) by 34 days.

(21) Appl. No.: 15/340,393

(22) Filed: Nov. 1, 2016

(65) Prior Publication Data

US 2018/0121421 A1    May 3, 2018

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2018.01) |
| *G06F 9/451* | (2018.01) |
| *A63F 13/50* | (2014.01) |
| *A63F 13/40* | (2014.01) |
| *A63F 13/25* | (2014.01) |

(52) U.S. Cl.
CPC .............. *G06F 9/454* (2018.02); *A63F 13/25* (2014.09); *A63F 13/40* (2014.09); *A63F 13/50* (2014.09)

(58) Field of Classification Search
CPC .......... A63F 13/25; A63F 13/40; A63F 13/45
See application file for complete search history.

(56) References Cited

PUBLICATIONS

Blizzard Entertainment, BradyGames World of Warcraft: Official Strategy Guide, 2004.*

* cited by examiner

*Primary Examiner* — Milap Shah
*Assistant Examiner* — Jason Pinheiro
(74) *Attorney, Agent, or Firm* — Duane Morris LLP (57) ABSTRACT

A game apparatus has a section that stores and controls language skill of a player character, a section of locating two or more sentence items, and a section of locating an item disclosure object. A kind of language and game information are set on the sentence item, and a disclosure item, the kind of language, language level and an approach sign are set on the item disclosure object. The apparatus further has a section of reading game information that is set on the sentence item, and a section of controlling language level executes a process of improving the language skill whenever reading the sentence item.

6 Claims, 9 Drawing Sheets

| GREEK | | RUSSIAN | | LATIN | |
|---|---|---|---|---|---|
| POINT | LEVEL | POINT | LEVEL | POINT | LEVEL |
| 50 | 2 | 75 | 4 | 10 | 1 |

VIDEO GAME APPARATUS FOR ENHANCING A LANGUAGE SKILL LEVEL OF A PLAYER AND PROGRAM THEREFOR

TECHNICAL FIELD

The invention relates to a video game apparatus and a program for providing a game that is realistic and interesting by introducing language elements, such as foreign languages, and elements of elevating levels of a player character.

BACKGROUND ART

A well-known conventional configuration of a video game, such as an adventure game and a role-playing game is that a player searches and obtains various kinds of items while the player character is moving on a field and uses these items in the game so as to advance a scenario.

DISCLOSURE OF INVENTION

Problems to be Solved by Invention

The game configuration tends to be simplified only by searching, finding and obtaining the items on the field, and even if the variety of items are increased so as to make the game more interesting, repeatedly searching for items in the game brings the player a feeling of a kind of work, thereby the player's motivation to continue the game is sometimes dampened:

But, it is important to increase the variety of items usable in the game in order to make the game realistic and interesting, and for doing so, it was necessary to develop the video game apparatus that implements an item search system for reducing a feeling of the work associated with the player's item searching operation, through which the player is able to enjoy the item searching process.

Under these situations, an object of the invention is to provide the video game apparatus and the program that implements an item search system for reducing a feeling of the work associated with the player's item searching operation, through which the player is able to enjoy the item searching process.

Means for Solving Problems

A first aspect of the invention is a game apparatus (1) in which a scenario proceeds in such a way that a player character (PC) is moved on a field (FLD) produced in a three-dimensional virtual space in a memory (5) through a controller (10) so as to search and obtain items located on the field (FLD), comprising:
  a language level controller (9) that stores and controls a language skill of the player character (PC) in a plurality of different languages (LK);
  a sentence item locator (6) that locates two or more sentence items (ST) on the field (FLD);
  an item disclosure object locator (6) that locates two or more item disclosure objects (MN) on the field (FLD);
  wherein a kind of language (LK) and game information (TX) are set for each of the two or more sentence items (ST);
  wherein a disclosure item (DI), the kind of language (LK) and a language level (GL) are set for each of the two or more item disclosure objects (MN);
  a sentence item reader (9) that executes on the sentence item (ST) a process of reading the game information (TX) that is set on the sentence item (ST) by an instruction from a player through the controller (10);
  the language level controller (9) that performs whenever the player character (PC) reads the sentence item (ST), a process of improving the language skill for the kind of language (LK) corresponding to the sentence item (ST);
  an object reader (9) that executes a process of accessing the item disclosure object (MN) by an instruction from the player through the controller (10);
  the object reader (9) that compares the language skill (LV) of the kind of language (LK) corresponding to the item disclosure object of the player character that is controlled through the language level controller (9) and the language level (GL) that is set on the item disclosure object with each other, judges whether the language skill (LV) is the same as the language level (GL) or higher and executes the process of accessing only when the language skill is the same as the language level or higher; and
  an item development section (6, 7) that executes a process of developing the disclosure item (DI) of the item disclosure object (MN) on the field (FLD) when the object reader (9) judges the language skill (LV) is the same as the language level (GL) or higher.

A second aspect of the invention is the game apparatus (1), wherein two or more kinds of languages are set as the kind of language (LK), and the language skill (LV) and the language level (GL) are controlled for each kind of language (LK) that is set.

A third aspect of the invention is the game apparatus (1), wherein the language level controller (9) executes a process in which a predetermined skill point (PT) is accumulated for the language skill (LV) of the player character (PC) whenever reading the sentence item (ST) and when the accumulated skill points (PT) of the player character reaches a predetermined value, the skill level (LV) of the language skill (LV) is raised by one step.

A fourth aspect of the invention is the game apparatus (1), wherein the process of accessing an item disclosure object is executed by an instruction through the controller (10) that causes the player character (PC) to approach the item disclosure object (MN) within a predetermined distance on the field (FLD).

A fifth aspect of the invention is the game apparatus (1), wherein the process of reading is executed by an instruction through the controller (10) that causes the player character (PC) to approach the sentence item (ST) within a predetermined distance on the field (FLD).

A sixth aspect of the invention is the game apparatus (1), wherein two or more steps of the language level (GL) and two or more steps of the skill level (LV) are set equal to each other.

A seventh aspect of the invention is a game program (PRO) in a computer (1) for advancing a scenario based upon the game program (PRO) in such a way that a player character (PC) is moved on a field (FLD) that is produced in a three dimensional virtual space in a memory (5) through a controller (10) so as to search and obtain items (IT) that are located on the field (FLD), wherein the program (PRO) provides the following computer functions:
  a language level controller (9) that stores and controls a language skill of the player character (PC) for each kind of language (LK) that is set for a sentence item (ST);

a sentence item locator (6) that locates two or more sentence items (ST) on the field (FLD);

an item disclosure object locator (6) that locates two or more item disclosure objects (MN) on the field (FLD);

wherein a kind of language (LK) and game information (TX) are set for each of the two or more sentence items (ST);

wherein a disclosure item (IT), the kind of language (LK) and a language level (GL) are set for each of the two or more item disclosure objects (MN);

a sentence item reader (9) that executes on the sentence item (ST) a process of reading the game information (TX) that is set on the sentence item (ST) by an instruction from a player through the controller (10);

the language level controller (9) that performs whenever the player character (PC) reads the sentence item (ST), a process of improving the language skill for the kind of language (LK) corresponding to the sentence item (ST);

an object reader (9) that executes a process of accessing the item disclosure object (MN) by an instruction from the player through the controller (10);

the object reader (9) that compares the language skill (LV) of the kind of language (LK) corresponding to the item disclosure object (MN) of the player character (PC) that is controlled through the language level controller (9) and the language level (GL) that is set on the item disclosure object (MN) with each other, judges whether the language skill (LV) is the same as the language level (GL) or higher and executes the process of accessing only when the language skill is the same as the language level or higher; and an item development section (6, 7) that executes a process of developing the disclosure item (IT) of the item disclosure object (MN) on the field (FLD) when the object reader (9) judges the language skill (LV) is the same as the language level (GL) or higher.

An eighth aspect of the invention is a game apparatus (1) for advancing a scenario in such a way that a player character (PC) is moved on a field (FLD) that is produced in a virtual space in a memory (5) based upon an input by a player so as to search and obtain items located on the field, comprising:

a level controller (9) that stores and controls a level (LV) of the player character (PC);

an item disclosure section (MN) being located on the field (FLD), on which an disclosure item (DI) and a disclosure level (GL) are set;

a level elevation action section (9) that causes the player character (PC) to take a predetermined action for elevating a level (such as an action of elevating the language level by an instruction through an input from the player and executes a process of elevating the level (LV) of the player character (PC) based upon the action for elevating the level;

an item disclosure access section (9) that executes a process of accessing the item disclosure section (MN) through the input from the player;

the item disclosure access section (9) that compares the level of the player character that is controlled through the level controller (9) and the disclosure level (GL) that is set on the item disclosure section (MN) with each other, judges whether the level is the same as the disclosure level or higher and executes the process of accessing only when the level is the same as the disclosure level or higher; and an item development section (6, 7) that executes a process of developing the disclosure item of the item disclosure section on the field (FLD) when the item disclosure access section (9) judges the level is the same as the disclosure level or higher.

Effects of Invention

According to the invention, the search of items is developed in accordance with the following steps: 1. Searching of the sentence item ST, 2. Obtaining of game information (TX) mentioned in the sentence item ST, on which the kind of language LK is set (Then, new information regarding the game scenario (game information) is provided), 3. Raising of the language skill (LV) of the corresponding kind of language LK, 4. Searching of the item disclosure object (MN), 5. Accessing the item disclosure object (MN) (in this case also, new information regarding the game scenario (game information) is provided), and 6. Disclosing a new item (IT) on the field (FLD). Therefore, the objective of the player on the field (FLD) is not only to search for items, but to obtain game information (TX), that is, to add a pleasure of obtaining intellectual information to the game, and the player is able to search the items having no feeling of work even if more items are located on the field (FLD), thereby exhibiting various kinds of scenario effects. In addition, it is possible to provide the player with much information without difficulty and to provide a serious game with various scenarios.

Besides, two or more kinds of language (LK) are set, so that it is possible to control the language skill (LV) and the language level (GL) of each kind of language (LK) that is set, to change the kind or the category of the game information that is offered for each language, thereby developing the scenario in various ways.

Furthermore, the language skill (LV) of the player character (PC) is processed in such a way that a predetermined point (PT) is accumulated whenever reading the sentence item (ST) and the skill level (LV) of the language skill is raised by one step when the accumulated skill point (PT) reaches a predetermined value, so that it is possible to control the language skill level (LV) of a player even if many sentence items (ST) are located and to provide the system that is easily understandable for the player.

The number in parentheses shows the corresponding element in the drawings for the sake of convenience, accordingly, the descriptions are not restricted and bound by the descriptions on the drawings.

EMBODIMENTS FOR CARRYING OUT THE INVENTION

An embodiment of the invention is now explained, referring to appended drawings.

Figure 1:
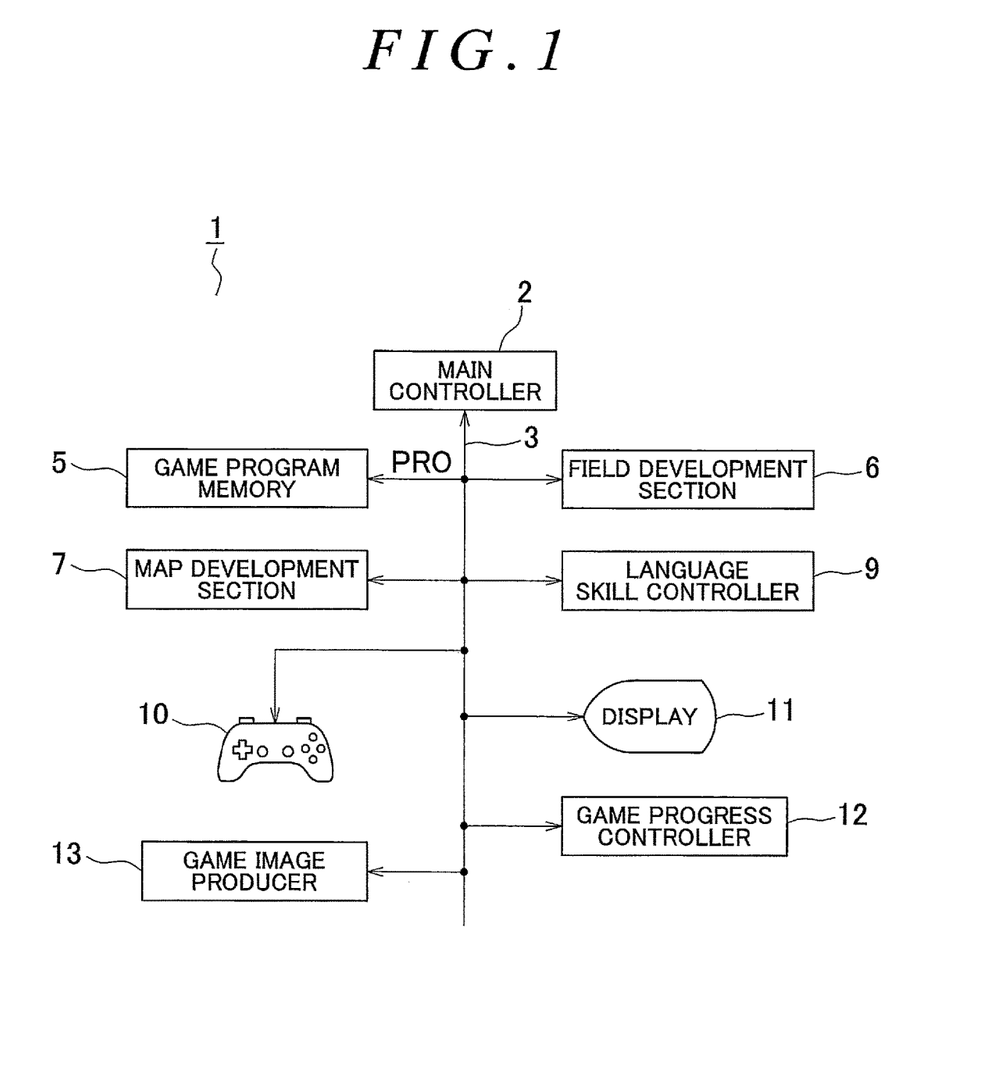
FIG. 1 is a control block diagram that shows an instance of a video game apparatus to which the present invention is applied.

A video game apparatus 1 as a computer to which the present invention is applied has a main controller 2, as shown in FIG. 1. A game program memory 5, a field development section 6, a map development section 7, a language skill controller 9, a controller 10, a display 11, a game progress controller 12 and a game image producer 13 are connected with the main controller 2 via a bus line 3.

Respective blocks of the main controller 2, the game program memory 5, the field development section 6, the map development section 7, the language skill controller 9, the game progress controller 12 and the game image producer 13 that comprises the video game apparatus 1 as shown in FIG. 1 are typically shown for easily understanding the present invention, but actually function as a computer comprising a CPU, a memory and various kinds of control programs. The video game apparatus 1 executes a part of a game program PRO that is mentioned hereinafter, so that the CPU of the video game apparatus 1 time-dividedly functions as respective function blocks of FIG. 1, but may be also configured such that the respective function blocks as shown in FIG. 1 are dedicated hardware and/or software.

The video game apparatus 1 has the above-mentioned configuration. When a player plays the game with the video game apparatus 1, the main controller 2 displays a predetermined game image IM on the display 11 through the game progress controller 12, the game image producer 13 and the like based upon the game program PRO stored in the game program memory 5 via wireless, a communication line, such as a cable, or memory elements with a well-known method, so that a play environment of the game is regulated.

Figure 2:
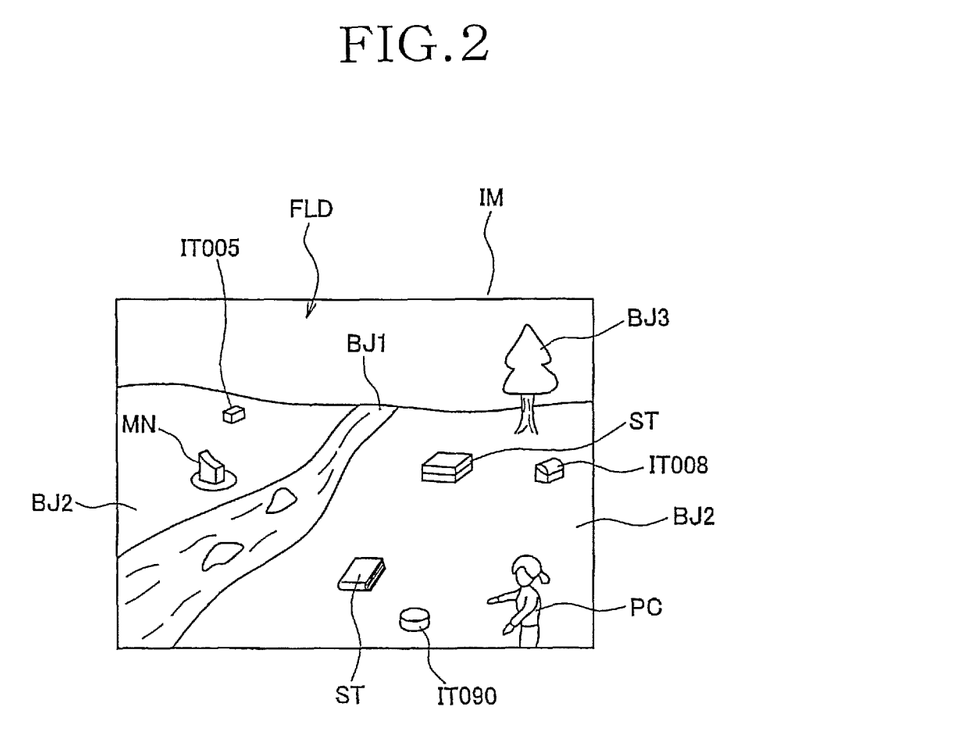
FIG. 2 is a view that shows an instance of a field displayed on a display.

In order to do so, a field FLD where a player character can move based upon the game program PRO is produced in a three dimensional virtual space produced in a memory space in the game image producer 13, and objects, such as a river BJ1, a ground BJ2, a tree BJ3, a player character PC and the like, are located on the field FLD based upon the game program PRO, as shown in FIG. 2. In such a state, a two dimensional image is produced and the game image IM is displayed on the display 11 through a rendering process from a proper position in the three dimensional space with a virtual camera. Such an image generating technology with CG is well known and the explanation is not mentioned.

Figure 4:
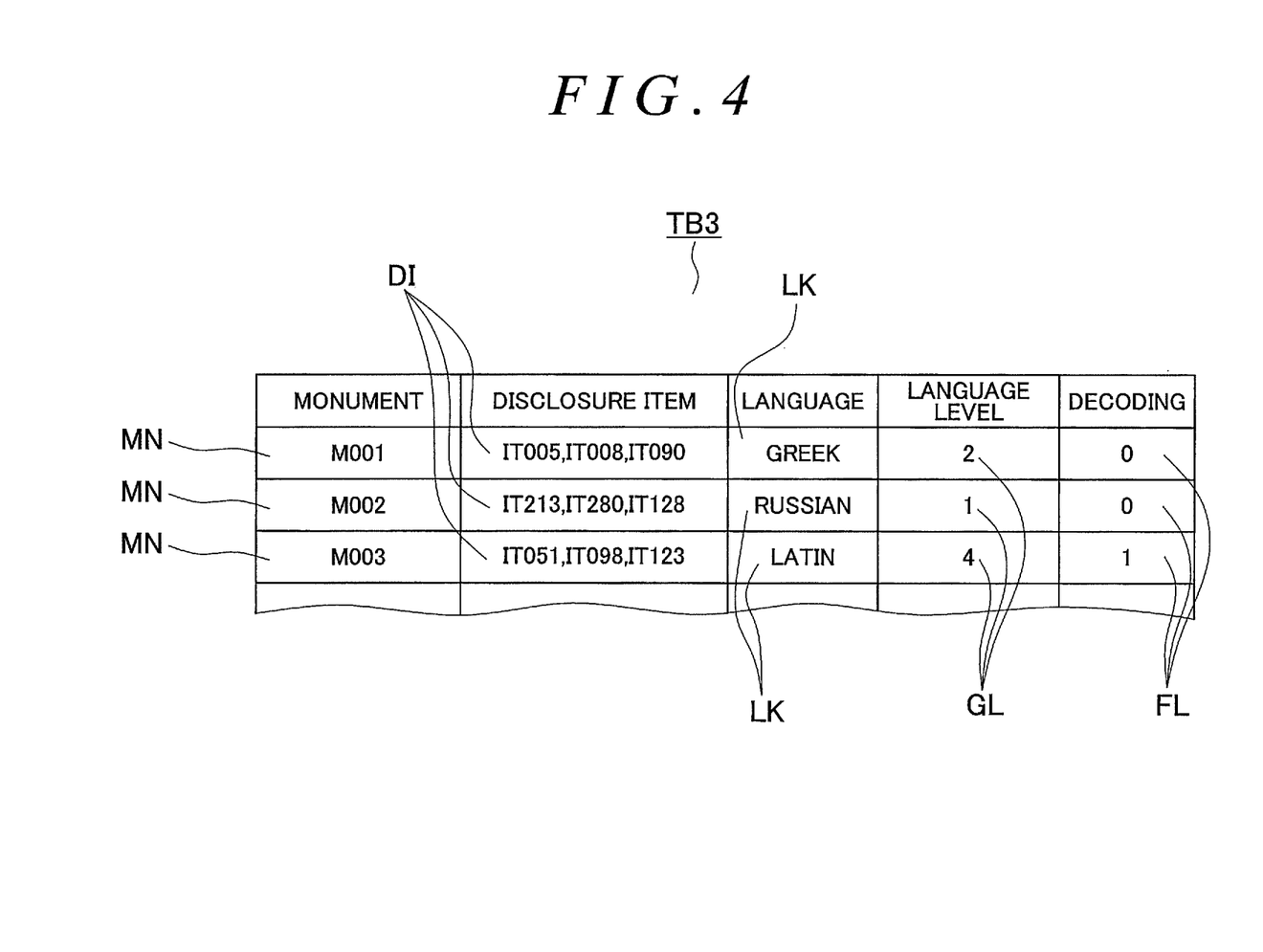
FIG. 4 is a view that shows an instance of a monument table.
Figure 5:
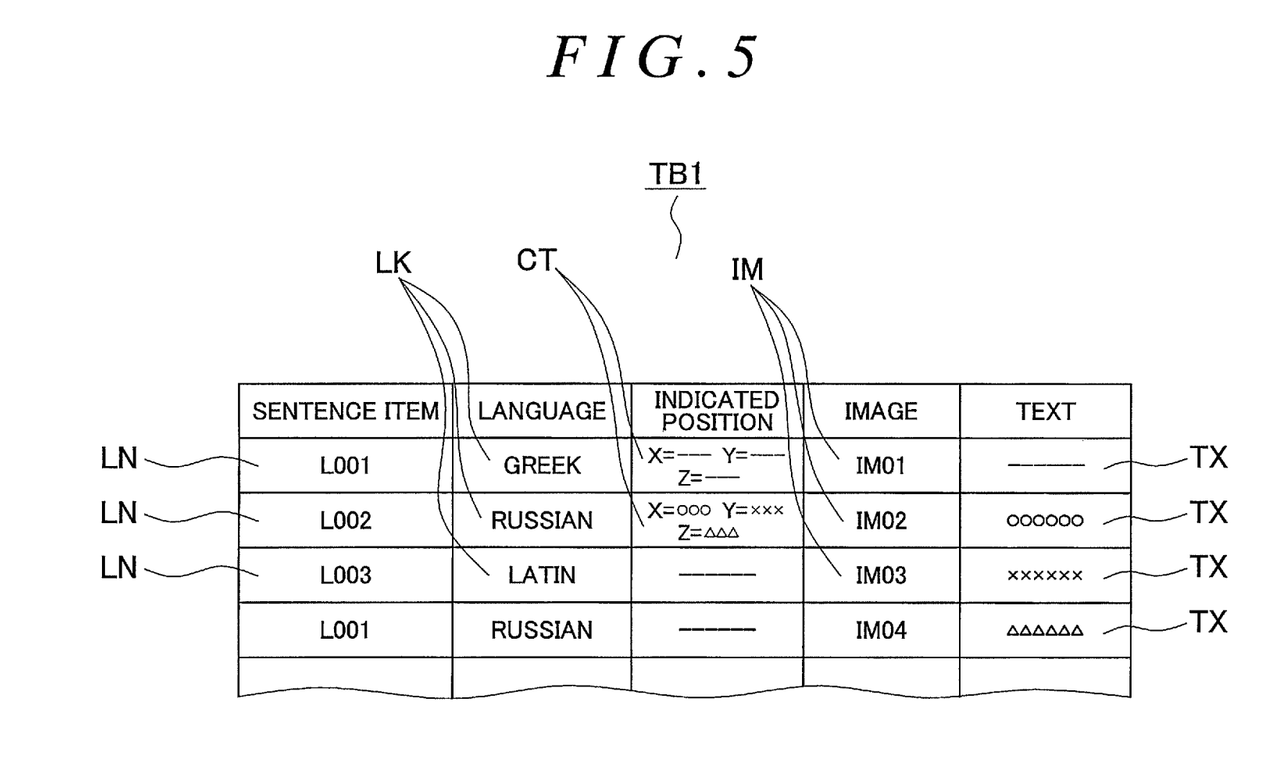
FIG. 5 is a view that shows an instance of a sentence item table.

As shown in FIG. 2, the field development section locates monuments MN as two or more item disclosure objects and sentence items ST as objects at predetermined positions of the field FLD through the game image producer 13 based upon the game program PRO, and as shown in FIGS. 4 and 5, specific identification numbers MN, LN are attached to the respective monuments MN and the sentence items ST that are controlled by the game progress controller 12 through the game program PRO. The objects on the field, the monument MN and the sentence item ST, have various kinds of shapes. For instance, the monument MN has a shape of a stone, and one of two sentence items ST has a shape of a document case and the other has a shape of a book in case of FIG. 2.

Many other items (not shown) are located on the field FLD through the field development section 6. By setting of the game program PRO, the player character PC that is operated by the player through the controller 10 freely obtains these items, and the obtained items can be used in various ways for the progress of a scenario.

The player character PC can freely move on the field FLD through an operation of the controller 10, and during the movement, the player character is able to access the monument MN or the sentence item ST through the operation of the player. The game progress controller 12 executes a language skill control program LSC in FIG. 8 that is a part of the game program PRO while the player character PC moves on the field FLD so as to control a scenario development of the language skill of the player character PC. The game progress controller always monitors a distance between the player character PC and the each sentence item ST on the field FLD, in Step S1 of the language skill control program LSC. When the player character PC approaches some sentence item ST on the field within a predetermined distance, the program enters Step S2, and a predetermined notice sign informing the player that the sentence item ST exists on the field is indicated on the display 11. Such signs are indicated by changing a color of the sentence item ST, changing its brightness and saturation, and displaying specific signs, such as arrows and stars, near the sentence item ST. If the existence of the sentence item ST on the field FLD is clear, it is not necessary to indicate such a notice sign specifically.

In a case where the notice sign informing that the sentence item ST exists near the player character PC moving on the field FLD is displayed (or the player character PC approaches the sentence item ST within a predetermined distance) and the player wishes to read the sentence item ST, the player instructs to do an approach action, reading the sentence item ST through the operation of the controller 10. If the player does not operate the controller, that is, does not input the approach action, the sentence item ST is not read by the player character PC.

As shown in FIG. 5, the sentence items ST on the field FLD are controlled by a sentence item control table TB1, and identification numbers LN, kinds of language. LK showing to which language the sentence item ST correspond, position coordinates CT of the sentence items ST indicated on field FLD, image file names IM indicating graphic images of the sentence items ST on the field FLD and texts TX mentioned in the sentence items ST as game information are set and stored for the respective sentence items ST located on the field FLD in the sentence item control table TB1. The identification numbers LN are indicated with L001, L002 . . . , and the kinds of language LK are one or more foreign languages, such as Greek, Russian and Latin (in this case, the foreign languages are languages excluding one usually used at a place where the player lives). The position coordinates CT are indicated with X, Y and Z three dimensional coordinates set on the field FLD, and the graphic image files IM are file names IM01, IM02 . . . that store image data showing the sentence items ST in the game program memory 5, such as graphic images of a book, a box and the like) and the texts TX are concrete contents mentioned in the sentence item ST and such contents are stored in the form of text data. Such a text TX is expressed with native language that the player can understand or with the language of a country where the game apparatus 1 is sold (for instance, the texts ST mentioned (stored) in the sentence item ST of L001 that is set as Greek and the sentence item ST of L002 that is set as Russian are expressed with one kind of language that the player can understand that is referred to as "the common understanding language" hereinafter in spite of the set kind of language LK), in spite of the setting of the kind of language LK of each sentence item ST. The common understanding language are English and Japanese, for instance. Even if the sentence item ST is set as the kind of language LK that the player is not able to understand, the contents of the sentence item ST is indicated with the common understanding language the player is able to understand in such a setting. In other words, the kind of language LK that is set on the sentence item ST is different from the kind of language of the text TX stored therein.

When the language skill control program LSC judges in Step S3 that the player instructs the player character PC to read the sentence item ST on the field FLD through the controller 10, the game progress controller 12 enters Step S4 and performs a process of specifying the identification number LN of the sentence item ST that the player character is going to read on the field FLD, referring to the sentence item control table TB1. After specifying the identification number LN of the sentence item ST, the program enters Step S5, and performs a process of reading out the text TX corresponding to the sentence item ST of the identification number LN and displaying on the display 11 through the game image producer 13. As already mentioned, the text TX is indicated by the common understanding language that the player is able to understand, and the player is able to easily understand the contents.

Figure 7:
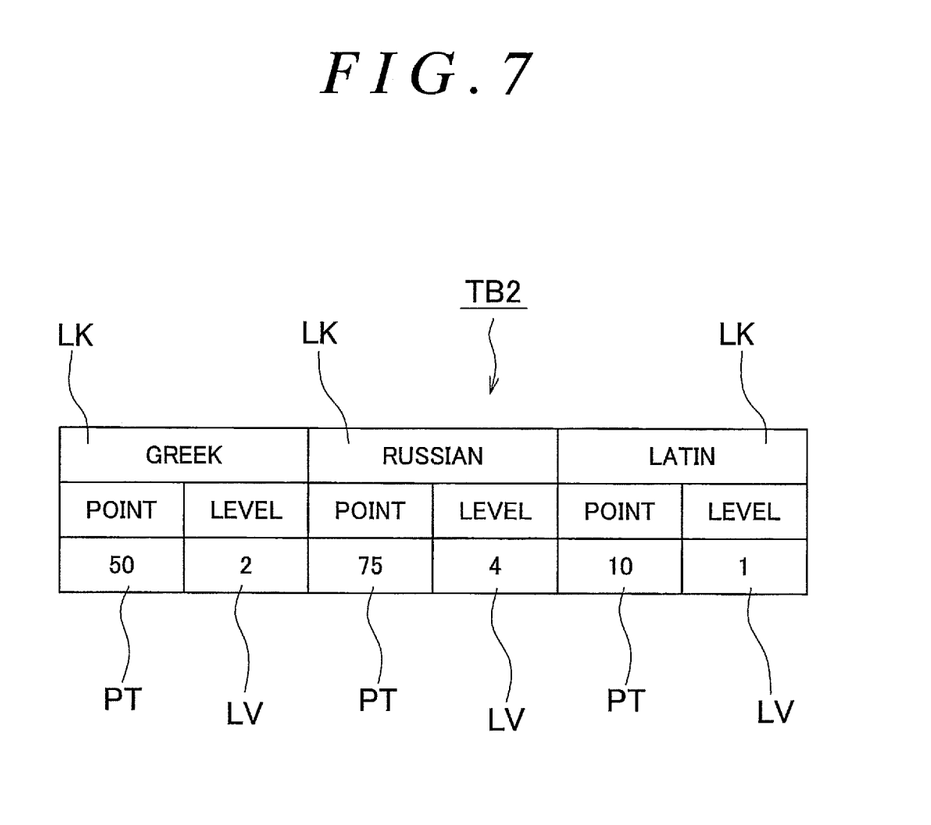
FIG. 7 is a view that shows an instance of a language skill status table.
Figure 8:
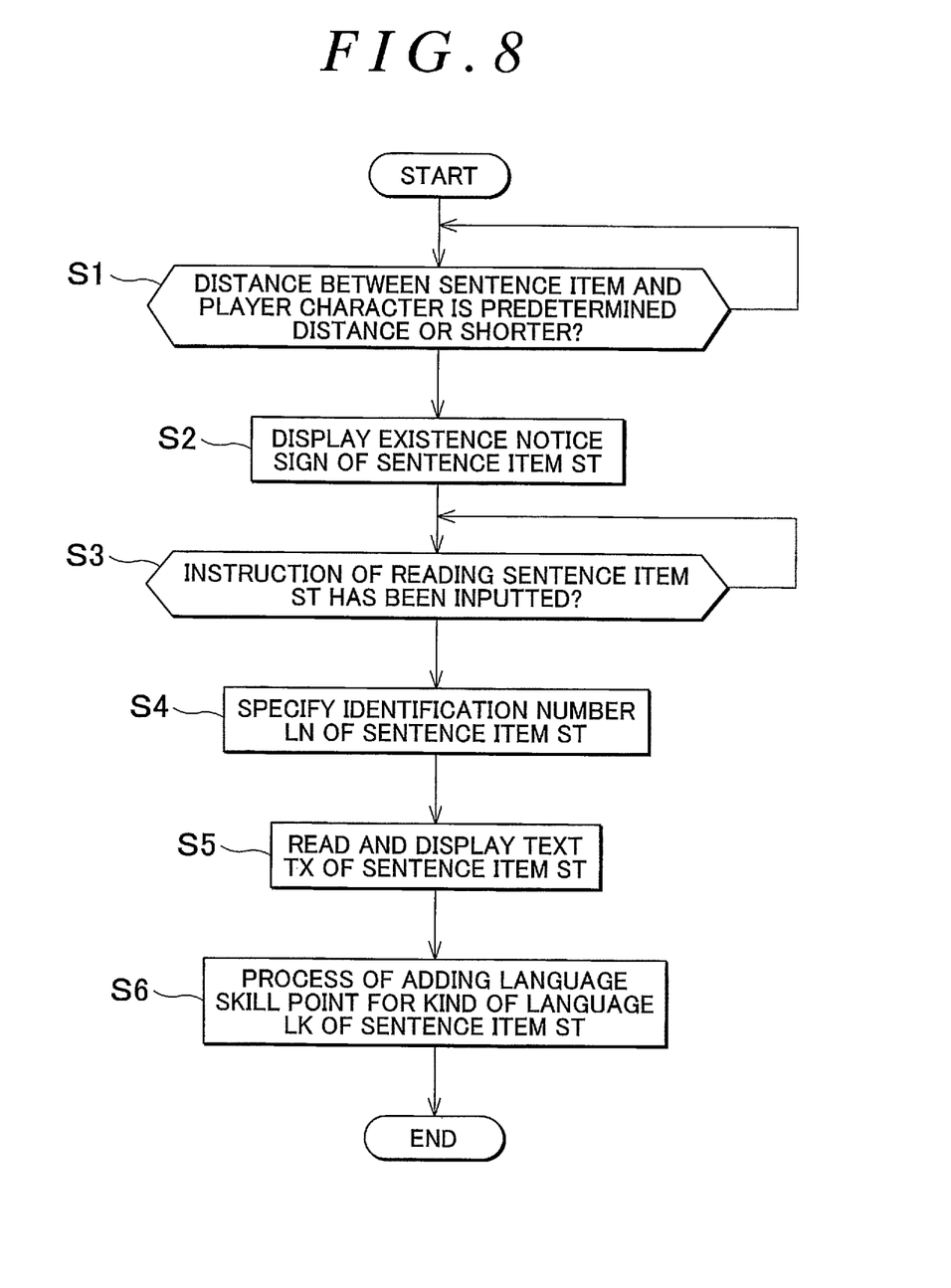
FIG. 8 is a flowchart that shows an instance of a language skill control program.

When indicating the text TX of the sentence item ST that the player instructed to read on the display 11, the language skill controller 9 enters Step S6 of the language skill control program LSC and performs a process of rewriting and updating the contents of the language skill table TB2 for the player that is stored in the game program memory 5, by adding a predetermined point to a skill point for the kind of language Lk that is set on the sentence item ST. That is, language skill of the player is stored in the language skill table TB2 for each kind of language LK, as shown in FIG. 7. And, the language skill controller 9 performs such an improvement process that by reading many sentence items ST that are located on the field FLD, a predetermined point is added to the skill point for the language shown in the kind of language LK that is set on the sentence item ST so as to improve the language skill. The player's present language skill is stored in the language skill table TB2 for each kind of language LK as an accumulated value PT of and a skill level LV of the present language skill, and when the accumulated value PT reaches a predetermined value, the integrated value PT is reset to "0 (zero)", and the skill level LV is only "1 (one)" elevated.

The player's language skill is determined by the skill level LV for each kind of language LK that is shown in the language skill table TB2 stored in the program memory 5 for the player, and this skill level LV determines whether an approach sign mentioned in two or more monuments MN that are located on the field FLD is possible to be decoded or not.

That is, as shown in FIG. 2, two or more monuments MN are located, as already mentioned, and each monument MN is controlled by a monument table TB3 stored in the game program memory 5, as shown in FIG. 4. The monument table TB3 stores identification number MN dedicated for each monument MN, disclosure item DI, kind of language LK, language level GL, decoding flag FL and coordinate position of the monument on the filed FLD (not shown). The language skill controller 9 controls through a decoding control program KPR comprising the game program PRO in such a way that in order for the player to access each monument MN, it is necessary for the player to have the language skill is the same as the level set on the language level GL or higher regarding the language set on each monument MN.

Figure 9:
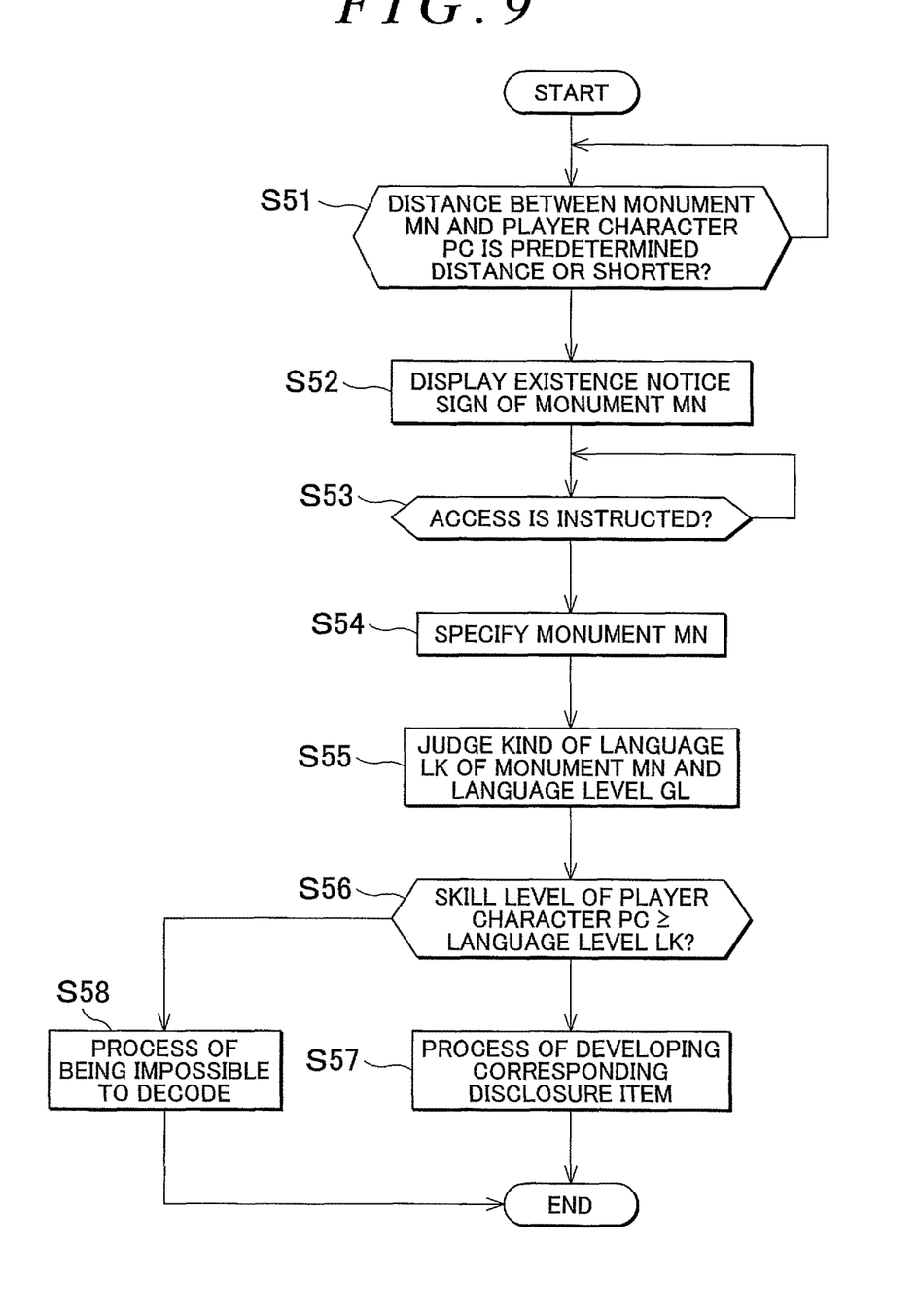
FIG. 9 is a flowchart that shows an instance of a decoding control program.

That is, the language skill controller 9 controls the player character's decoding of the approach sign of each monument, such letter information, based upon the decoding control program KPR as shown in FIG. 9. In Step S51, the distance between the player character PC and each monument on the field FLD is always monitored, and if the player character PC approaches some monument MN on the field FLD within a predetermined distance, the program enters Step S52 and the notice sign informing the player that the monument MN exists on the field FLD is displayed on the display 11. Such signs are indicated by changing a color of the monument MN, changing its brightness and saturation, and displaying specific signs, such as arrows and stars, near the monument MN. If the existence of the monument MN on the field FLD is clear, it is not necessary to indicate such a notice sign specifically.

In a case where the sign informing that the monument MN exists near the player character PC moving on the field FLD is displayed (or the player character PC approaches the monument MN within a predetermined distance) and the player wishes to access the monument MN, the player instructs to access the monument MN through the operation of the controller 10. If the player does not operate the controller, the player character PC does not access the monument MN.

When the reading control program KPR judges in Step S53 that the player instructed the player character PC to access the monument MN on the field FLD through the controller 10, the program enters Step S54, the game progress controller 12 specifies the monument MN that the player character PC is going to read on the field FLD from the coordinate position of the player character PC on the field FLD, referring to the monument table TB3 as shown in FIG. 4. After specifying the monument MN, the game progress controller 12 judges the kind of language LK and the language level GL of the specified monument MN in Step S55 of the reading control program KPR, referring to the monument table TB3, and judges in Step S56 whether the present skill level LV of the player character PC is the same as the language level GL set on the monument MN or higher regarding the language shown in the kind of language LK. For instance, the monument MN which identification number MN is M001 is Greek as the kind of language LK and 2 as the language level GL, and the present skill level LV of Greek of the player character PC is 2 from FIG. 7, so that the game progress controller 12 judges the player character PC is able to access the monument MN.

Figure 6:
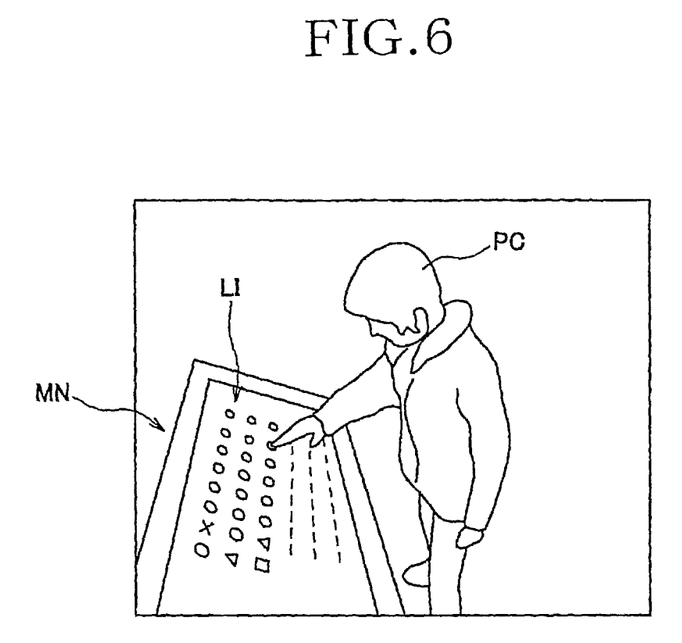
FIG. 6 is a view that shows an instance of an image of a player character who reads a sentence mentioned in the monument in a game.

After judging the accessibility to the monument MN, the game progress controller 12 executes an access process mentioned hereinafter and enters Step S57, and instructs the field development section 6 and the map development section 7 to execute such a disclosure process that items IT005, IT008 and IT090 stored in the disclosure item DI column of the monument table TB3 that correspond to the identification number MN, M001, are located and displayed on the field and a map. At the same time, the game progress controller 12 causes the game image producer 13 to display an access image where the player character PC is reading the sentence shown in the monument MN as shown in FIG. 6, and to display corresponding letter information LI and the like. In this case, the letter information and the like may be indicated by outputting audio information, such as sounds (not shown) as well as with the image on the display 11.

Figure 3:
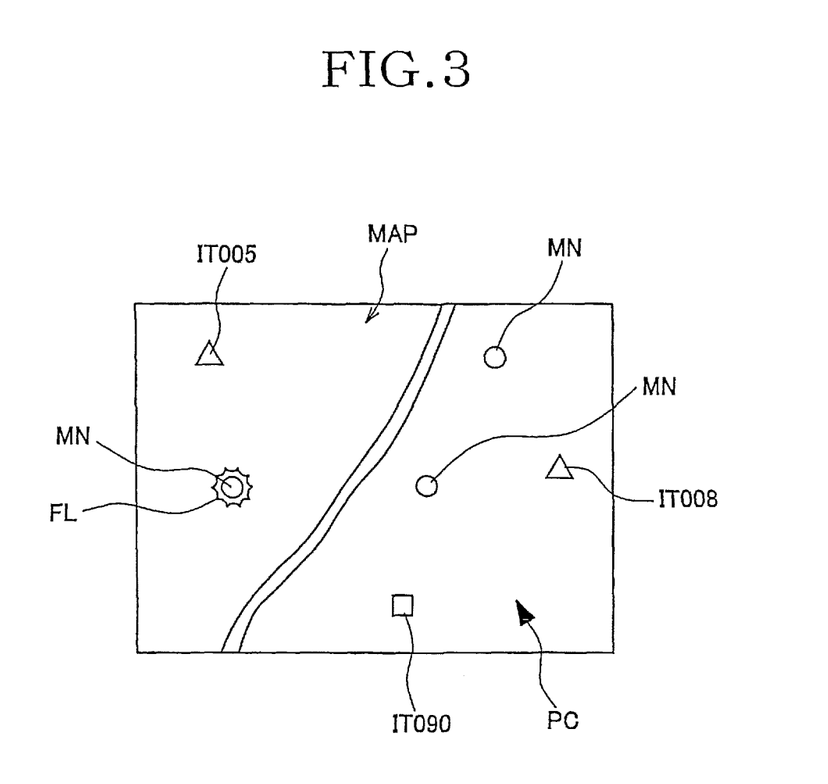
FIG. 3 is a view that shows an instance of a map displayed on the display.

Regarding the items instructed to be displayed, such as IT005, IT008 and IT090, the field development section 6 locates and develops the respective items IT005, IT008 and IT090 on the field FLD as objects as shown in FIG. 2 and the map development section 7 locates the respective disclosed items IT005, IT008 and IT090 on a two-dimensional map MAP obtained by two-dimensionally developing the three-dimensional field FLD, corresponding to the located positions on the field FLD, and displays these on the display 11 as shown in FIG. 3. The respective items on the map MAP may be indicated by changing their indication forms according to the kind of the item. In a case of FIG. 3, the kinds of the respective items IT005, IT008 and IT090 are indicated, distinguishing these with a triangle and a quadrangle.

When displaying the map MAP, the map development section 7 displays each monument MN at the same time, and clearly indicates the positional relation between each monument MN and each item IT005, IT008 and IT090. The position to be displayed of each item on the field FLD is determined by the game program PRO, and each item corresponding to the monument MN is not indicated on the map MAP and the field FLD as long as the player character does not access the approach sign that is defined (set) on the monument.

For this reason, the player is motivated to positively access the approach sign of the monument MN on the field FLD. It is not always necessary to associate the contents shown by the approach sign that is set on each monument MN with the items IT005, IT008 and IT090 corresponding to the monument MN, and the location of new item is only disclosed by accessing the approach sign that is set on the monument MN. In a case where the approach sign is comprised of the letter information, it is indicated with the common understanding language that the player is able to understand irrespective of the kind of language LK that is set on each monument MN.

It is not always necessary to set meaningful letter information on the approach sign that is set on the monument MN as a proof of a success of the player's access, and some kind of a sign for an incentive to make the player character access the monument MN and to disclose the disclosure item that is set on the monument MN, such as a design shown on the surface of the object of the monument MN, letters including letter information, illustration and sound, may be set, and these may be outputted in response to the success of the player character PC's access. In such a case, the player character PC is able to clear Step S53 of the decoding control program KPR of FIG. 9 if the player character PC performs some approach action (including reading of the letter information) to the monument MN by the instruction from the player through the controller 10 (for instance, pushing action of a specific operation button).

The player is able to use the item in such a way that the player moves the player character PC on the field FLD, referring to the position of each item that is newly indicated on the map MAP so as to find the item located on the field FLD, and obtains such an item. If the monument MN is decoded, "0 (zero)" is stored at the decoding flag of the monument table TB3 as shown in FIG. 4, showing that the monument MN has been decoded, that is, the corresponding items IT005, IT008 and IT090 has been disclosed.

In a case of the monument MN, which identification number MN is M003 of FIG. 4, for instance, the kind of language LK is Latin and the language level GL is set to be 4, the present skill level LV of the Latin of the player character PC is "1" as known from FIG. 7, the game progress controller 12 judges that the skill level LV does not reach the language level GL that is set on the monument in Step S56 of the decoding control program KPR and judges the player character PC is not able to decode the monument MN.

The program enters Step S58 after such a judgment the monument MN is disabled to be decoded, and a process of impossibility to decode is done. In other words, regarding the monument MN, a non-decoding sign showing that the player character PC has not yet decoded the letter information LI of the monument MN is displayed on the map MAP as shown in FIG. 3 by flashing a figure that indicates the monument, for instance, and the decoding flag FL "1" is shown (or an initial value "1" is kept) on the section of the corresponding monument MN of the monument table TB3 of FIG. 4 that shows the monument MN has not yet been decoded.

The player is able to advance the scenario in such a way that he (or she) searches various kinds of the sentence items ST located on the field FLD, making the player character PC move on the field FLD, and reads the sentence item ST so as to accumulate the language skill of the player character PC for each kind of language LK, and approaches the item disclosure object located on the field FLD, such as the monument MN and discloses the item that is set every item disclosure object with the thus increased language skill.

With such a configuration, the player is freed from the simple repetition work, only gathering the item located on the field FLD earnestly, and is able to obtain information regarding a new progress of the game from approach signs, such as the text TX mentioned in the sentence item ST and the letter information LI that is defined by the item disclosure object, and the scenario development that is complex and varied is possible thereby.

Besides, the text TX and the letter information LI that are set on each sentence item ST and the item disclosure object are set by the common understanding language that is sufficiently understandable for general players, irrespective the kind of language LK that is set on each sentence item ST and the disclosure object, so that the game having a new originality, in which a concept of plural languages is introduced, can be offered without complicating the game progress more than required.

Even if the judgment in Step S56 of the decoding control program KPR is that the skill level LV of the player character PC does not reach the language level GL that is set on the monument at the time of judgment of Step S56, and the process of being impossible to decode has been thus done, it is possible for the player to read the sentence of the item disclosure object that he (or she) was not be able to read till then in such a way after such a process of being impossible to decode, he (or she) finds out many sentence items ST, moving the player character PC on the field FLD and repeatedly reads the texts TX that are set on the sentence items ST so as to obtain the skill point of the corresponding kind of language LK and to raise the skill level LV.

The search for items is thus developed as follows: 1. Searching of the sentence item ST, 2. Reading of the text TX that is set on the kind of language LK indicated in the sentence item ST (Then, new information regarding the game scenario (game information) is provided), 3. Increasing the language skill of the corresponding kind of language LK, 4. Searching of the item disclosure objects, 5. Obtaining of the approach sign that is defined on the item disclosure object (in this case also, new information regarding the game scenario (game information) is provided), and 6. Disclosing the new item on the field FLD. Therefore, the action purpose of the player on the filed FLD is not only to search for items, but to obtain game information, such as the text TX and the approach sign, so that it is possible to add such a pleasure of obtaining intellectual information to the game, and the player is able to search the items having no feeling of work even if more items are located on the field FLD, thereby exhibiting various kinds of scenario effects. In addition, it is possible to provide the player with much information without a difficulty and to provide a serious game with various scenarios. Of course, such a conventional development and a method that the items simply located on the field FLD are searched and obtained, moving the player character on the field are used together, thereby providing a highly interesting game.

The invention was mentioned as such an instance that the process of searching the items that is set on the scenario so as to collect by the player character PC is developed generally as follows: 1. Searching of the sentence items ST, 2. Reading of the text TX that is set on the kind of language LK indicated in the sentence item ST, 3. Increasing the language skill of the corresponding kind of language LK, 4. Searching of the item disclosure object, 5. Obtaining of the approach sign that is defined on the item disclosure object, and 6. Disclosing the new item on the field FLD. But, the essence of the invention is that the process of locating the items on the field is configured to provide (A) a process of executing the action for raising some skill (the language skill in the embodiment, but the other proper skill may be set) regarding the player character PC, (B) a process of judging the skill level of the player character PC and judging whether such a level reaches a predetermined one, and (C) a process of disclosing a site on which a new item is located on the field when the judgement is the player character PC has the skill level is the same as a predetermined one or higher, and the important point of the invention is that the process of locating the items on the field is done in two steps, obtaining of the skill and disclosure of the item corresponding thereto.

EXPLANATION OF REFERENCE NUMBERS

1 . . . game apparatus, computer
5 . . . memory (game program memory)
6 . . . item locator, item disclosure object locator, item development section (field development section)
7 . . . item development section (map development section)
9 . . . language level controller, level controller, sentence item reader, object reader, item disclosure access section (language skill controller)
10 . . . controller
DI . . . disclosure item
GL . . . language level, disclosure level
LK . . . kind of language
LV . . . language skill, level (skill level)
MN . . . item disclosure object, item disclosure section (monument)
PC . . . player character
ST . . . sentence item
TX . . . game information (text)
FLD . . . field

The invention claimed is:
1. A game apparatus in which a scenario proceeds in such a way that a player character is moved on a field produced in a three-dimensional virtual space in a memory through a controller so as to search and obtain items located on the field, comprising:
a sentence item control table stored in the memory of the game apparatus, said sentence item control table storing a first set of information associated with a plurality of sentence items, the first set of information comprising: a kind of language set for each sentence item, a display position on the field for each sentence item, and game information text for each sentence item;
an item disclosure object table stored in the memory of the game apparatus, said item disclosure object table storing a second set of information associated with a plurality of item disclosure objections, the second set of information comprising: a disclosure item associated with each item disclosure object, a kind of language and a language level set for each item disclosure object, and a display position on the field for each item disclosure object located on the field;
a language skill table (TB2) stored in the memory of the game apparatus, the language skill table storing a language skill level of the player character for each kind of language identified in the sentence item control table and the item disclosure object table; and
at least one processor, coupled to the memory and configured to:
access the sentence item control table and the item disclosure object table, and further configured to control a language skill level of the player character for each kind of language identified in the sentence item control table and the item disclosure object table;
locate two or more sentence items at predetermined positions on the field based on the display position on the field of each sentence item stored in the sentence item control table;
locate two or more item disclosure objects on the field;
wherein a kind of language and game information text are set for each of the two or more sentence items;
wherein a disclosure item, the kind of language and a language level are set for each of the two or more item disclosure objects;
in response to one or more instructions from a player through the controller cause the player character to access a sentence item located on the field and to read the game information text of the sentence item by referring to the sentence item control table;
wherein whenever the player character reads the game information text of the sentence item, execute a process of improving the language skill so as to store an updated skill level of the player character in the language skill table for the kind of language set for the sentence item accessed by the player character and stored in the sentence item control table;
judge the kind of language and the language level associated with the item disclosure object accessed by the player character by referring to the item disclosure object table and referring to the skill level of the player character for the kind of language associated with the item disclosure object requested to be accessed by referring to the language skill table, and comparing the skill level and the language level set for the accessed item disclosure object,
only when the skill level of the player character is the same as the language level set on the item disclosure object or higher, grant access to the item disclosure object requested to be accessed; and execute a process of developing and displaying the disclosure item associated with the item disclosure object on the field by referring to the item disclosure object table when the execution of the process of accessing the item disclosure object is enabled by the at least one processor.

2. The game apparatus according to claim 1, wherein the at least one processor further increases a skill point value for the player character for the kind of language set for the accessed sentence item whenever the player character reads the accessed sentence item and when the skill point value reaches a predetermined value, the skill level of the language skill for the kind of language is raised by one step.

3. The game apparatus according to claim 1, wherein the at least one processor further monitors a distance between the player character and the item disclosure object on the field, and executes a predetermined notice process when the distance becomes a predetermined distance, wherein the process of accessing the item disclosure object is executed when the at least one processor executes the notice process.

4. The game apparatus according to claim 1, wherein the at least one processor further monitors a distance between the player character and the sentence item on the field, and executes a process of allowing the player character to read the game information text of sentence item when the player character is within a predetermined distance of the sentence item on the field.

5. The game apparatus according to claim 2, wherein two or more steps of language level are set, and two or more steps of skill level are also set, corresponding to the language level.

6. A non-transitory computer-readable medium storing a game program for advancing a scenario based upon the game program in such a way that a player character is moved on a field that is produced in a three dimensional virtual space in a memory of a computer by inputting commands through a controller so as to search and obtain items that are located on the field, wherein the game program when executed by the computer performs a method comprising:

accessing a sentence item control table stored in the memory of the computer, wherein said sentence item control table stores a first set of information associated with a plurality of sentence items, the first set of information comprising a kind of language, a display position on the field, and game information text for each sentence item of the plurality of sentence items;

accessing an item disclosure object table stored in the memory of the computer, wherein said item disclosure object table stores a second set of information associated with a plurality of item disclosure objects, the second set of information comprising a disclosure item, a kind of language, a language level, and a display position on the field for each item disclosure object of the plurality of item disclosure objects;

accessing a language skill table stored in the memory of the computer, the language skill table storing a language skill level of the player character for two or more languages;

locating two or more sentence items at predetermined positions on the field based on the display position on the field of each sentence item stored in the sentence item control table;

locating two or more item disclosure objects at predetermined positions on the field based on the display position on the field of each item disclosure object stored in the item disclose object table;

causing the player character to access the sentence item located on the field based on an instruction from a player through the controller to read the game information text that is associated with the sentence item by referring to the sentence item control table;

when the player character reads the game information text for the sentence item, executing a process of improving the language skill by storing an adjusted skill level of the player character in the language skill table for the language set for the sentence item stored in the sentence item control table;

judging the kind of language and the language level set on the item disclosure object to which the access instruction is inputted by the player by referring to the item disclosure object table and determining the skill level of the player character for the judged language by referring the language skill table, and comparing the skill level and the language level associated with the item disclosure object to which access is requested and only when the skill level of the player character is the same as the language level set for the item disclosure object or higher, enabling access to the item disclosure object by the player character; and executing a process of developing and displaying the disclosure item associated with the item disclosure object on the field by referring to the item disclosure object table when access to the item disclosure object is enabled.

\* \* \* \* \*